Aug. 29, 1967    W. A. WRASSE    3,338,333

LUBRICATING DEVICE

Filed Dec. 18, 1964

INVENTOR.
WILBUR A. WRAASE

BY Harry M. Saragovitz
Edward J. Kelly, Herbert Berl
& Charles F. Murphy

ATTORNEYS

United States Patent Office

3,338,333
Patented Aug. 29, 1967

3,338,333
LUBRICATING DEVICE
Wilbur A. Wraase, Holliston, Mass., assignor to the United States of America as represented by the Secretary of the Army
Filed Dec. 18, 1964, Ser. No. 420,254
3 Claims. (Cl. 184—1)

ABSTRACT OF THE DISCLOSURE

A device for lubricating a bearing mounted on the shaft of a rotatable element comprising an elongated housing for the rotatable element, a readily detachable end piece mounted on one end of the housing for engaging the bearing and conducting lubricant under pressure to one side of the bearing and a second end piece mounted on the other end of the housing to support the rotatable element with the bearing in lubricating position.

---

The invention described herein, if patented, may be manufactured and used by or for the Government for governmental purposes without the payment to me of any royalty thereon.

This invention relates to a device for lubricating bearings mounted on the shaft of a rotatable element without removing the bearings from the shaft, and more particularly to a device comprising means for maintaining one side of a bearing mounted on a shaft in lubricant-sealing connection with a source of lubricant under pressure.

The proper lubrication of ball bearings commonly used on the shafts of high speed rotating elements is a continuing problem to users of this type of equipment. This is especially true where so-called sealed or shielded ball bearings are used as in blower motors used with frequency shift converters employed by the Armed Forces. If these bearings are not maintained adequately lubricated, the blower motor burns out and expensive equipment is damaged due to failure of the blower. It has been customary to oil these bearings semi-annually using a light oil applied with the assistance of a needle. However, since the openings in the shielded bearings are very narrow, only small amounts of oil penetrate into the bearings and the operation is very time-consuming. Furthermore, in order to obtain penetration into the bearings the viscosity of the oil must be so low that lubrication of the bearings becomes ineffective over an extended period of time and unless extreme care is exercised in applying oil to the bearings there is danger that they will burn out before the regularly scheduled re-oiling time occurs.

Lubricating devices have been employed, particularly in the automotive field, for packing shielded bearings such as wheel bearings by removing the bearings from their shafts, clamping them in the lubricating device so that one side of the shielded bearing is held tightly against a frustoconical surface while the center bore of the bearing is maintained sealed and lubricant is forced through the balls or rollers of the shielded bearing by hydraulic pressure. However, in the electric motor art it is desirable to be able to lubricate the bearings of an armature without the necessity of removing them from the armature shaft. Removal of the bearings without damage and proper alignment on replacement require equipment and skills not generally available to personnel who must maintain these motors. This is particularly true for military uses such as in blower motors of frequency shift converters.

It is, therefore, an object of the invention to provide a device for lubricating a bearing mounted on the shaft of a rotatable element without removing the bearing from the shaft.

Another object is to provide a device for lubricating a shielded bearing mounted on the shaft of a rotatable element, such as the armature of a motor, without removing the bearing from the shaft.

Another object is to provide a device for lubricating a first shielded bearing mounted on the shaft of a motor armature near one end thereof and then a second shielded bearing mounted on the shaft of the motor armature near the other end thereof without removing the bearings from the shaft.

Various other objects and advantages will appear from the following description of one embodiment of the invention and in the appended claims.

Figure 1:
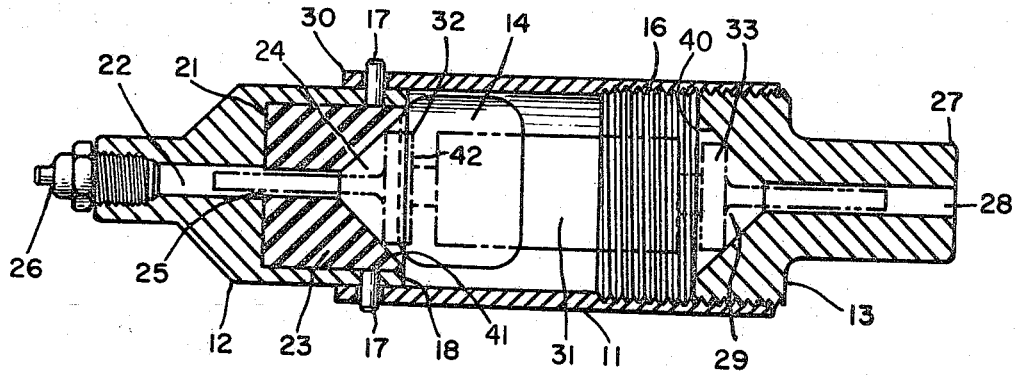
FIGURE 1 is a longitudinal cross-section of a lubricating device in accordance with the present invention with an electric motor armature and its two shielded roller bearings mounted on its shaft shown in phantom within the lubricating device.

In the illustrated embodiment of the invention, the lubricating device comprises an elongated tubular body or housing 11, a first closure member 12, detachably mounted within one end of the body 11 by means of a bayonet-type joint and a second closure member 13 mounted within the other end of body 11 and adjustable longitudinally thereof.

The elongated tubular housing 11 is provided with a window 14 therein near one end thereof through which it is possible to observe the interior of the housing for a purpose to be described. The same end of the housing has a pair of diametrically opposed L-shape slots 15 therein which comprise the female portion of the bayonet-type joint. The opposite end of the housing is provided with internal threads 16 for a purpose to be described.

Figure 2:
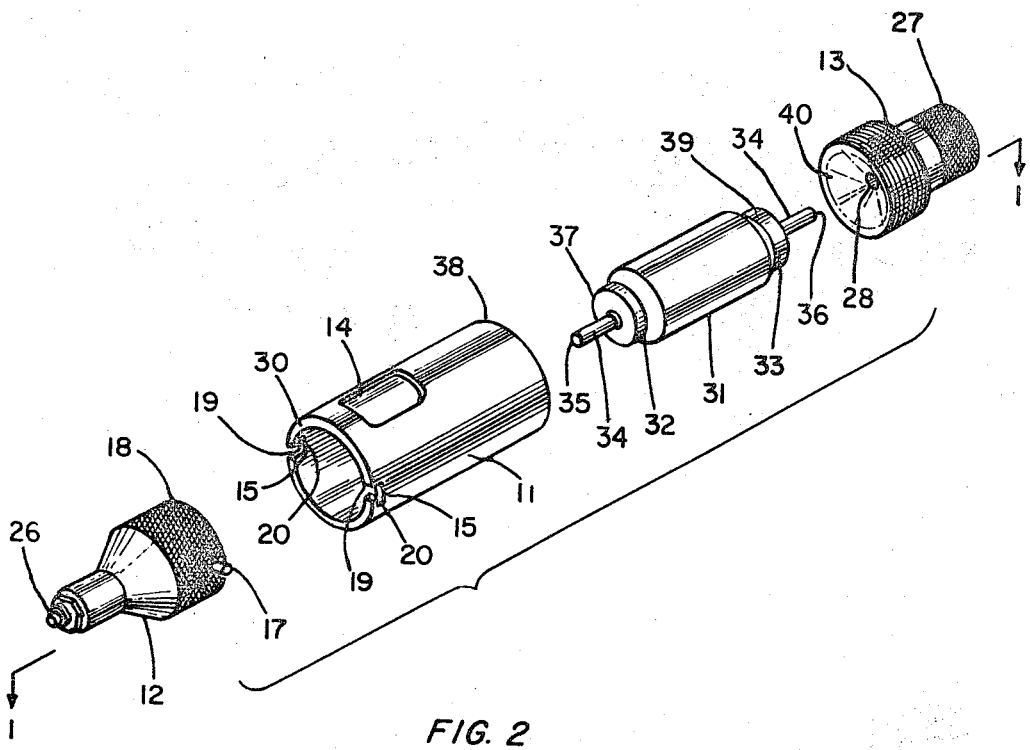
FIGURE 2 is an exploded view of the lubricating device of the invention and of a motor armature with two shielded bearings mounted on the shaft thereof.

The first closure member 12 is generally cylindrical in shape, having an outside diameter slightly less than the inside diameter of the housing to permit closure member 12 to fit in the end of the housing. A portion of member 12 is preferably knurled on its exterior surface to facilitate gripping thereof. Two pins 17 are located at diametrically opposed points on the periphery of closure member 12 near the inner end 18 thereof extending perpendicularly outwardly therefrom forming the male portion of the bayonet-type joint between the closure member 12 and the body 11. When the end 18 of closure member 12 is inserted in the end of housing 11, each pin 17 will pass through a first leg 19 of an L-shaped slot 15, and, when closure member 12 is rotated clockwise, the pins will pass through the second legs 20 of the L-shaped slots 15, thus locking closure member 12 to housing 11 in a non-adjustable manner. The outer end of the closure member 12 may be of reduced diameter as shown in FIGURES 1 and 2 to reduce the weight of the device.

The inner end of closure member 12 is provided with a large central bore 21 therein, while a smaller bore 22 concentric with the larger bore extends through to the outer end of the member. The terminal portion of bore 22 is tapped for a purpose to be described. A resilient gasket 23, preferably made of a type of rubber which is not attacked by lubricants, is mounted in the large central bore 21 as best shown in FIGURE 1. The gasket is formed to define a generally frustoconical cavity 24 opening toward the end thereof facing housing 11 and concentric therewith. The size of said cavity is adapted to receive the outer peripheral edge of a bearing to be lubricated in the device. The gasket 23 is provided with a central bore 25 extending from the inner end of said frustoconical cavity to bore 22 in said closure member and sized to loosely receive the shaft of a rotatable element therein.

A conventional hydraulic lubrication fitting 26 is mounted in the tapped portion of the central bore 22 providing a means for introducing lubricant under pressure from a lubricating gun or other lubricant source (not shown) to the inner end of frustoconical cavity 24 and thence to the bearing.

The second closure member 13 is also generally cylindrical in shape and is externally threaded to cooperate with the internal threads 16 in housing 11. The outer end 27 of closure member 13 has a cylindrical extension of reduced diameter and is preferably knurled to facilitate gripping with the fingers and thumb for the purpose of turning second closure member 13 to adjust its position within housing 11. Closure member 13 is provided with a central bore 28 of substantially the same diameter as central bore 22 of first closure member 12, both of which being sufficient to loosely receive the shaft of a rotatable element during lubrication of bearings thereon. The inner end of closure member 13, that is the end facing the interior of housing 11, has a generally frustoconical cavity 29 therein of substantially the same dimensions as the frustoconical cavity 24 in resilient gasket 23.

In the use of the lubricating device, first closure member 12 with resilient gasket 23 and lubrication fitting 26 mounted therein is locked to the first end 30 of tubular housing 11. Motor armature 31 with shielded ball bearings 32 and 33 mounted on shaft 34 near opposite ends 35 and 36 thereof is placed within tubular housing 11 so that shaft end 35 passes through central bore 25 of resilient gasket 23 and into central bore 22 and the peripheral edge 37 of bearing 32 rests against resilient gasket 23. Second closure member 13 is fitted to the second end 38 of tubular housing 11 so that their threads mesh and shaft end 36 of motor armature 31 passes through frustoconical cavity 29 and into central bore 28. Closure member 13 is rotated clockwise until the peripheral edge 39 of bearing 33 rests firmly against frustoconical surface 40 of second closure member 13 and the peripheral edge 37 of bearing 32 is thus tightly sealed against frustoconical surface 41 of resilient gasket 23. The lubricant is then forced into frustoconical cavity 24 through lubrication fitting 26 and central bore 22, thence through the bearing 32. When lubricant appears on the inner face 42 of bearing 32, it may be observed through window 14 indicating that bearing 32 is substantially fully packed or lubricated.

The motor armature is removed from the lubricating device by unlocking first closure member 12 from housing 11 and bearing 33 is lubricated by reversing the armature, placing it in the lubricating device, relocking first closure member 12, making any adjustment of second closure member 13 required to effect a tight seal between the peripheral edge 39 of bearing 33 and resilient gasket 23 and repeating the lubricating steps as described above.

Within reasonable limits of a selected lubricating device in accordance with this invention armatures of varying sizes having shielded bearings of varying diameters mounted on the shafts thereof may be quickly and conveniently lubricated by means of the device of this invention. The internal diameter of the tubular housing 11 will, of course, be limiting. Also the frustoconical cavities 24 and 29 are limiting with respect to the diameters of the shielded bearings 32 and 33 which can be accommodated therein and form a lubricant sealing relation between bearing 32 or 33 and resilient gasket 23, as the case may be. However, the frustoconical surface 41 is particularly advantageous in that it permits the lubrication of shielded bearings having diameters from slightly greater than the diameter of central bore 25 of resilient gasket 23 to slightly less than the outside diameter of resilient gasket 23. Shielded bearings of any diameter between these limits will form a lubricant tight seal with gasket 23 around the periphery of the bearing such that lubricant will be forced through bearing in the desired manner.

While the above-described embodiment of the invention relates to a device for lubricating the shielded bearings mounted on the shaft of a motor armature, it will be readily understood that the invention is applicable to various other types of bearings mounted on the shafts of rotatable elements of mechanical equipment. The size of shape of the component elements of the lubricating device may be varied without departing from the spirit of the invention.

Where it may be desirable to obtain a higher rate of production in lubricating bearings in accordance with the present invention, as where a large number of assemblies are to be lubricated, the second closure member may be provided with a resilient gasket and a lubrication fitting similar to the construction of the first closure member 12. With the addition of another viewing window in the body 11, both bearings could be lubricated in the same manner without the need for reversing the assembly within the lubricating device.

The lubricating device of this invention provides a means for greatly increasing the speed and efficiency of lubricating shielded bearings mounted on the shafts of rotatable elements, such as armatures of motors. It renders unnecessary the removal of the shielded bearings from the shafts of such equipment in order to lubricate them. This in turn reduces the misalignment or misfitting of such bearings on the shafts since damage previously caused by removal of the bearings from the shafts for lubrication purposes is avoided. The overall costs of maintaining electric motors and other similar equipment having rotatable elements are accordingly reduced as a result of the present invention.

It will be understood that various changes in the details, materials, and arrangements of parts, which have been herein described and illustrated in order to explain the nature of the invention, may be made by those skilled in the art within the principle and scope of the invention as expressed in the appended claims.

I claim:

1. A device for lubricating bearings mounted on the shaft of a rotatable element comprising:
    (a) an elongated tubular body capable of receiving said rotatable element therein and having a side opening near one end thereof,
    (b) a first closure member detachably mounted on the end of said body having the side opening, the end of said member adjacent to said body having a resilient portion forming a cavity having a generally frustoconical interior surface capable of engaging the periphery of a bearing mounted on the shaft of said rotatable element in lubricant-sealing relation, a central bore concentric with said frustoconical surface capable of receiving the free end of said shaft, and means for conducting a lubricant under pressure from the exterior of said closure member to the inner end of the cavity defined by said frustoconical surface, and
    (c) a second closure member mounted on the other end of said body having means for adjusting said second member longitudinally of said body and means for positioning said shaft within said body whereby said bearing to be lubricated may be firmly engaged against said resilient frustoconical surface in said first closure member.

2. A device for lubricating a bearing mounted on the shaft of a rotatable element without removing said bearing from said shaft comprising:
    (a) an elongated tubular housing capable of receiving said rotatable element therein and having a side opening near one end thereof,
    (b) a first closure member detachably mounted on the end of said housing having said side opening, said closure member having a central bore extending therethrough and a resilient portion defining a generally frustoconical cavity adjacent to said housing, said central bore and frustoconical cavity both being concentric with said housing, said central bore being capable of receiving the free end of a shaft upon which the bearing to be lubricated is mounted and said resilient portion being capable of engaging a peripheral edge of said bearing in lubricant-sealing relation, (c) a lubrication fitting mounted in said central bore of said closure member at the end thereof opposite said cavity, and (d) a second closure member mounted in the other end of said housing, said second closure member having means for adjusting said second member longitudinally within said housing and means to position said rotatable element in said housing whereby said bearing to be lubricated may be firmly engaged against the frustoconical surface of said resilient portion in said first closure member.

3. A device for lubricating a bearing assembly comprising two bearings mounted on the shaft of a rotatable element, comprising:

(a) an elongated tubular housing capable of substantially enclosing said rotatable element, said housing having a window adjacent a first end thereof for observing the interior of said housing, quickly releasable locking means in said first end thereof and internal threads in a second end thereof;

(b) a non-adjustable member supporting a resilient gasket defining an open-ended frustoconical cavity capable of engaging a first bearing in lubricant-sealing relation adjacent to said first end of said tubular housing, said member having a central bore extending therethrough concentric with said frustoconical cavity and a lubrication fitting mounted in the end of said central bore opposite said cavity, said central bore capable of receiving the free end of the shaft of said rotatable element while permitting passage of lubricant from said lubrication fitting through said central bore to said frustoconical cavity, said non-adjustable member having locking means capable of cooperating with said locking means in the first end of said tubular housing for mounting said member thereon; and (c) an adjustable member having threads cooperating with said threads in said second end of said tubular housing to permit longitudinal adjustment of said member, an open-ended generally frustoconical cavity capable of engaging the second bearing opening inwardly of said tubular housing, and a central bore concentric with said frustoconical cavity capable of receiving the shaft of said rotatable element; whereby said first bearing mounted on the shaft of said rotatable element may be supported in sealing relation with said gasket by adjustment of said adjustable member and lubricated by introducing lubricant under pressure through said lubrication fitting until lubricant may be observed through said window in said housing on the side of said first bearing opposite the side thereof held in lubricant-sealing relation to said resilient gasket.

References Cited

UNITED STATES PATENTS

| | | | |
|---|---|---|---|
| 1,505,776 | 8/1924 | Glade. | |
| 2,396,124 | 3/1946 | Pitisci | 184—1 |
| 2,681,711 | 6/1954 | Sievenpiper | 184—105 |

LAVERNE D. GEIGER, *Primary Examiner.*

E. J. EARLS, *Assistant Examiner.*